May 11, 1965

A. W. HAYDON 3,183,426

MAGNETICALLY COUPLED CONSTANT SPEED SYSTEM

Filed Feb. 14, 1962

INVENTOR.
ARTHUR W. HAYDON

BY

Mandeville & Schweitzer
ATTORNEYS

May 11, 1965

A. W. HAYDON 3,183,426

MAGNETICALLY COUPLED CONSTANT SPEED SYSTEM

Filed Feb. 14, 1962

*INVENTOR.*
ARTHUR W. HAYDON

BY

*Mandeville & Schweitzer*

ATTORNEYS

May 11, 1965  A. W. HAYDON  3,183,426
MAGNETICALLY COUPLED CONSTANT SPEED SYSTEM
Filed Feb. 14, 1962
5 Sheets-Sheet 3

INVENTOR.
ARTHUR W. HAYDON
BY
Mandeville & Schweitzer
ATTORNEYS

May 11, 1965

A. W. HAYDON 3,183,426

MAGNETICALLY COUPLED CONSTANT SPEED SYSTEM

Filed Feb. 14, 1962

INVENTOR.
ARTHUR W. HAYDON

BY

*Mandeville & Schweitzer*
ATTORNEYS

United States Patent Office 3,183,426
Patented May 11, 1965

3,183,426
MAGNETICALLY COUPLED CONSTANT
SPEED SYSTEM
Arthur W. Haydon, Milford, Conn., assignor to Consolidated Electronics Industries Corp., Waterbury, Conn., a corporation of Delaware
Filed Feb. 14, 1962, Ser. No. 173,179
34 Claims. (Cl. 318—302)

The present invention relates to constant speed systems, and more particularly to novel and improved constant speed systems for clocks, timers, governors and the like, in which unique magnetic arrangements are provided for coupling various elements for controlled relative movement.

In general, the present invention is directed to the provision of novel magnetic coupling arrangements for constant speed devices of the type having an oscillating member, such as a balance wheel, arranged to act intermittently on another member, such as a pallet lever, to actuate the last-mentioned member alternately between two operating positions.

In a typical clock or chronometric governor mechanism, for example, a balance wheel is oscillated at a known, fixed frequency by a hair spring. A pallet lever, mounted for limited pivotal movement between two operative positions, cooperates with the balance wheel and, during a limited portion of each half-cycle excursion of the balance wheel, the pallet lever is engaged by an impulse pin on the balance wheel and shifted from one operating position toward the other. The pallet lever also cooperates with means, such as an escape wheel, which is urged to move by a spring or motor, and the escape wheel is released for incremental movement when the pallet lever is shifted. During the shifting of the pallet lever from one operative position to another, a measured impulse of energy is transferred therethrough to the balance wheel to keep the wheel in sustained oscillating movement.

In a conventional constant speed mechanism, all of the foregoing operations are quite critically related, and costly, precision manufacture and workmanship is required in order to achieve reliably accurate operation. Further, accuracy and reliability are adversely affected by wear, and quality mechanisms require the use of expensive "jewels" at the wear points in order to achieve useful operating life of reasonable length.

In accordance with the present invention, a novel constant speed mechanism is provided in which certain of the critical operating relationships are effectively achieved through the use of magnetic interactions, this result being brought about in such manner as to retain the accurate and reliable operation characterizing a fine time piece, for example, while materially reducing the need for extremely precise workmanship and also significantly reducing the number of costly "jewels" required to achieve reasonable operating life.

One of the more specific aspects of the invention resides in the provision of a novel constant speed mechanism for a clock or timer, for example, incorporating an oscillating inertia member (e.g., a balance wheel), a pallet lever, and an escape wheel driven by a spring or motor, in which some and advantageously all of the operating interactions involved in converting sustained oscillations of the inertia member to regulated intermittent movement of the escape wheel are brought about through the use of controlled magnetic influences and without actual mechanical contact between the parts involved.

Another of the more specific aspects of the invention resides in the provision of a novel and improved constant speed mechanism for incorporation in a chronometric governor in a manner to achieve reliable, accurate constant speed governing control over the operation of an electric motor. In connection with this aspect of the invention, the new mechanism is advantageously incorporated in a chronometric governor of the type shown in the A. W. Haydon United States Patent No. 2,523,298 or of the type shown in the copending application Ser. No. 721,706, filed March 17, 1958, by A. W. Haydon et al., now Patent No. 3,058,017, in which the timed, oscillating movements of a balance wheel are interrelated with rotations of an electric motor such that the motor circuit is closed at regular intervals by movements of the balance wheel and opened by the motor, after each closure, at a time determined by the tendency of the motor to overspeed under the prevailing conditions of load, power supply, etc. The new arrangement affords significant advantages in such an arrangement, in respect of reductions in cost of manufacture, increased operating life, etc., and the new system is particularly appropriate of use in conjunction with chronometric governor arrangements of the type described above, since certain advantageous magnetic interactions have been used heretofore in such mechanisms and lend themselves to advantageous employment in the new system.

A further specific and particularly unique aspect of the invention resides in the provision of a novel and improved form of chronometric governor incorporating the constant speed mechanism of the invention in an especially advantageous manner such that the pallet lever, conventionally used and heretofore thought to be necessary, may be eliminated entirely. Thus in chronometric governors of the type under consideration, a pair of resilient deflectable elements form circuit contact members for a motor. When the elements are deflected in unison the motor circuit remains closed but when one is deflected while the other is restrained, the circuit opens. Heretofore, it has been customary to utilize the pallet lever, in its operative positions, to restrain or hold back the contact elements at appropriate times. However, in accordance with the present invention, the pallet lever is eliminated altogether, and proper, timed retention and release of the contact elements is brought about by the balance wheel itself, in conjunction with fixed detent means.

The major aspects of the invention are capable of a wide variety of specific application, to achieve various advantageous results. For a consideration of a number of specific forms of the invention, as well as for a better understanding of its fundamental aspects, reference should be made to the following detailed description and to the accompanying drawings, in which:

Figure 1:
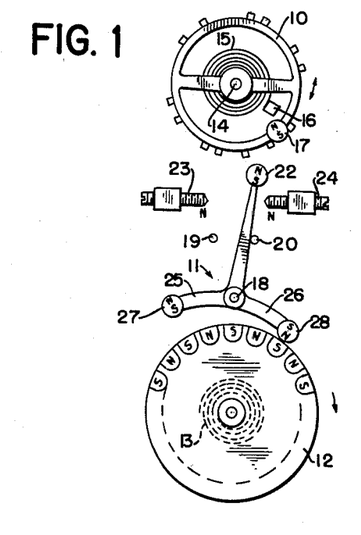
FIG. 1 is a simplified representation of a constant speed mechanism according to the invention, for use in a clock, watch, or timer, for example.
Figure 2:
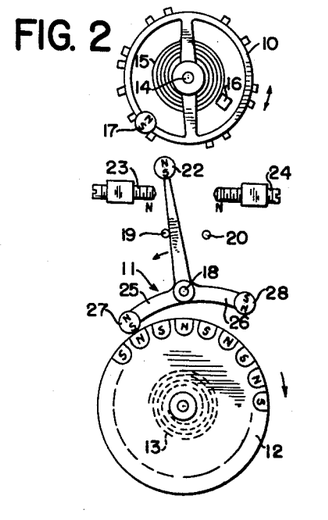
FIG. 2 is a view similar to FIG. 1, showing the mechanism in a different operating condition.

Referring now to the drawings, and initially to FIGS. 1 and 2 thereof, there is shown a constant speed mechanism suitable for use in a clock, watch or timer, for example, and including a balance wheel 10, pallet lever 11, escape wheel 12 and main spring 13. Conventionally, the main spring (or other source of energy input) drives the escape wheel 12 through a suitable gear train, which has been omitted in the present illustration for purposes of simplification. The balance wheel 10 is mounted on a staff 14 and is connected to a hair spring 15 anchored at its outer end, at 16. When set in motion, the balance wheel will oscillate with substantially pure harmonic characteristics at a frequency determined by the inertia of the balance wheel and the characteristics of the hair spring.

In accordance with the invention, the balance wheel has mounted thereon a magnetic element 17 and, in the mechanism of FIG. 1, the element 17 is mounted on the outer rim of the balance wheel. Advantageously, the magnetic element is made of ferrite material, such that a small element may be provided with well defined "north" (N) and "south" (S) pole area. Further, in the mechanism of FIG. 1, the magnetic element is oriented so that the principal axis of the N and S magnet poles is disposed generally radially with respect to the balance wheel.

In the mechanism of FIG. 1, the balance wheel, pallet lever and escape wheel are disposed along a "neutral" axis, and the magnetic element 17 is so positioned on the rim of the balance wheel 10 that the magnet lies on the neutral axis when the balance wheel is in its neutral or rest position.

The pallet lever is in the form of an inverted Y and is mounted on a shaft 18, at the intersection of the arms of the Y, for the limited pivotal movement between two principal operating positions determined by spaced banking pins 19, 20 which straddle the vertical arm 21. At the upper end of the pallet lever arm 21 there is mounted a second magnetic element 22 which, like the element 17, advantageously is made of ferrite material and has well defined N and S pole areas. The poles of the pallet lever magnet 22 are aligned on the axis of the lever arm 21, so that the poles would be aligned with the "neutral" axis if the pallet lever 11 were positioned midway between the banking pins 19, 20.

Advantageously, detent means are associated with the pallet lever 11 to hold the lever in one or the other of its principal operating positions with a predetermined detention force. In the mechanism of FIG. 1, the detent means comprises a pair of spaced screws 23, 24, mounted for adjustable movement toward and away from the neutral axis of the system. The detent magnets are mounted below the pallet lever magnet 22, in positions suitable to provide effective magnetic interaction between the detent magnets and pallet lever magnet while avoiding effective interaction between the detent magnets and the balance wheel magnet 17. In this respect, the geometry of the elements is favorable, since the balance wheel magnet 17 is carried in an upward arc from the neutral position while the pallet lever magnet 22 is carried in a downward arc, toward the detent magnets.

The detent magnets 23, 24 may also be formed of ferrite material, polarized so that their N poles are toward the neutral axis, for attractive interaction with the S pole of the pallet lever magnet 22.

On the lower arms 25, 26 of the pallet lever there are mounted magnetic elements 27, 28 which, for descriptive purposes, will be referred to as locking magnets. In the specific mechanism of FIGS. 1 and 2, the locking magnets 27, 28 are reversely oriented. That is, the left side magnet 27 has its N pole facing generally upward while the right side magnet 28 has its S pole facing generally upward. Both magnets advantageously are formed of ferrite material and have well defined poles.

As indicated in FIGS. 1 and 2, the orientation of the pole axes of the locking magnets 27 and 28 is such that, when the pallet lever is in its right hand operating position (FIG. 1), the right side magnet 28 has its axis disposed generally radially with respect to the escape wheels and, when the pallet lever is in its left hand operating position (FIG. 2) the axis of the left magnet 27 is disposed radially with respect to the escape wheel.

Advantageously, the escape wheel 12 comprises a thin disc of ferrite material, and the circumferential area of the wheel is provided with well defined poles of alternating polarity. The escape wheel is so positioned in the assembly that, when the pallet lever 11 is in one or the other of its principal operating positions, one of the locking magnets 27 or 28 will closely approach but not actually touch the edge of the escape wheel. Thus, when the mechanism is in its FIG. 1 operating condition, for example, the locking magnet 28 closely approaches the wheel 12, and the N pole of the locking magnet strongly attracts the nearest S pole of the escape wheel, effectively restraining the wheel against further movement. When the pallet lever is pivoted to its FIG. 2 condition, the wheel 12 is temporarily released, caused to advance one increment by the main spring 13, and then restrained again by attraction of the left locking magnet's S pole to an approaching N pole of the escape wheel.

In the operation of the new mechanism of FIGS. 1 and 2, it may be assumed that the mechanism is in the condition shown in FIG. 1, with the balance wheel moving in a clockwise direction. When the balance wheel magnet 17 closely approaches the pallet lever magnet 22, the S and N poles of these respective magnets have a strongly attractive interaction and, as the balance wheel magnet continues to move toward and through the neutral axis, the interaction between the magnets 17, 22 overcomes the lesser combined attractive interaction between the pallet lever magnet 22 and detent magnet 24 and between the locking magnet 28 and the adjacent S pole of the escape wheel. Accordingly, the pallet lever 11 is pivoted to the left.

As the pallet lever pivots to the left, the attractive influence between the locking magnet 28 and the escape wheel quickly becomes ineffective, allowing the wheel to be advanced by the mainspring. At the same time, the left side locking magnet 27 is approaching the edge of the wheel, and an effective attractive interaction is established between the S pole of the magnet 27 and the approaching N pole 12a of the escape wheel. This interaction causes the pallet lever to be drawn sharply to the left to impart an impulse of energy to the balance wheel 10.

After a short travel, the pallet lever 11 is stopped by the banking pin 19, while the balance wheel, through its momentum, continues its clockwise excursion free of effective magnetic influence from the pallet lever magnet 22. A similar sequence of operations takes place on the counterclockwise excursion of the balance wheel, as will be understood. And, as will further be understood, the operation of the mechanism is self-sustaining through the energy input impulses to the balance wheel on the occasion of each advance of the escape wheel. In this respect, the loss of effective magnetic attraction between the retreating locking magnet is hastened by the advance of the escape wheel, while the establishment of effective attractive interaction between the advancing locking magnet and the escape wheel is hastened by the advance of the wheel. The differential action thus afforded results in the transmission of a net energy input impulse through the pallet lever and into the balance wheel to make up for various friction losses and maintain the balance wheel in continuous operation with uniform excursions.

It will be noted that, in the mechanism of FIGS. 1 and 2, movements of the escape wheel are controlled by the balance wheel wholly without the interposition of mechanically contacting elements. Thus, the critical points of wear of a similar but conventional, mechanical mechanism are eliminated, and this permits several "jewels" to be omitted from the system and greatly reduces the amount of precision workmanship required in the making of a reliable, accurate mechanism.

Figure 3:
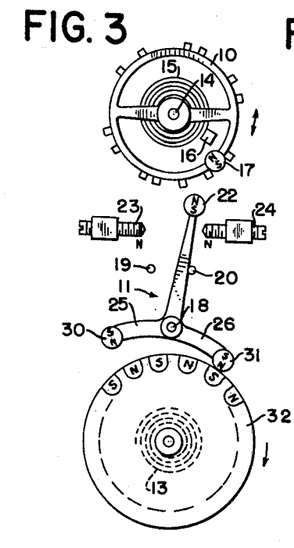
FIG. 3 is a view, similar to FIG. 1, of a slightly modified form of the new constant speed mechanism.

The mechanism of FIG. 3 is similar in most respects to the mechanism of FIGS. 1 and 2, except that the locking magnets 30, 31 (corresponding generally to the locking magnets 27, 28 of the first described mechanism) are symmetrically oriented, with the S poles of both magnets facing generally upward. The escape wheel 32 also is slightly different, in the respect that the spacing of the circumferentially alternating N and S poles is changed to correspond to the symmetrically related locking magnets. The operation of the mechanism of FIG. 3 is substantially identical to that of the mechanism of FIGS. 1 and 2.

Figure 4:
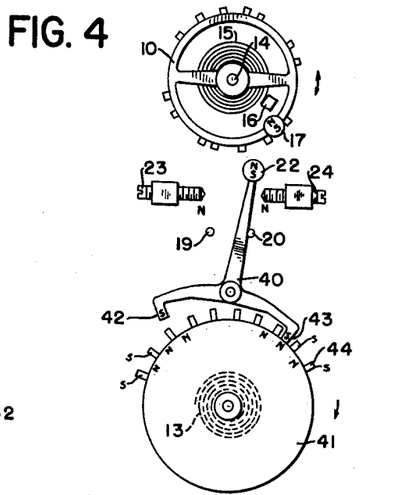
FIG. 4 is a view, similar to FIG. 1, of a further modified form of the device of FIG. 1, incorporating mechanical-type safety interlock means.
Figure 5:
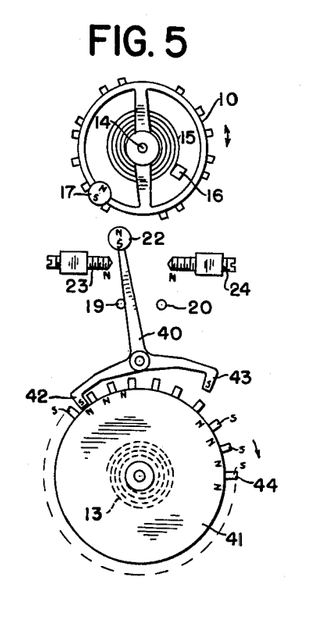
FIG. 5 is a view similar to FIG. 4 showing the mechanism thereof in a different operating condition.

The mechanism of FIGS. 4 and 5 is generally similar to that of FIGS. 1–3, except that the pallet lever 40 and escape wheel 41 are arranged to provide positive mechanical safety locking of the escape wheel movement. Advantageously, the pallet lever 40 is formed of ferrite material and has pole projections 42, 43 at the ends of its lower arms, both polarized in the same manner so that, in the illustrated arrangement, both polar extensions constitute S poles.

In accordance with the invention, the escape wheel 41 is formed with a plurality of radially projecting lugs spaced wide enough apart to receive between any two of them one of the polar extensions 42 or 43. The escape wheel and its lugs are formed of ferrite material, and each of the lugs is polarized the same as the polar extensions of the pallet lever, that is, as S poles, while the circumferential areas of the wheel between the lugs are polarized to form N poles.

In general, the operation of the mechanism of FIGS. 4 and 5 is similar to that of the mechanisms of FIGS. 1–3. When the mechanism is in the condition shown in FIG. 4, the polar extension 43, forming in effect a locking magnet, closely approaches the edge of the escape wheel in attractive relation to an N pole of the wheel.

The locking magnet 43 also is between and therefore in effective repelling relation to the lugs 44 of the escape wheel. With the parts in the described condition, the escape wheel is held in position, not only by the attractive force, but also by the repelling forces exerted between the lugs 44 and the locking magnet. Further, the arrangement provides a positive mechanical lock against unintended movements of the escape wheel, it being understood, however, that the mechanical lock would not come into play during normal operation of the mechanism.

Figure 6:
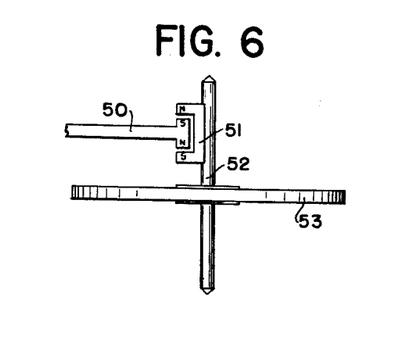
FIGS. 6–8 are simplified representations of several modified forms of magnetic arrangement for coupling a balance wheel and pallet lever in accordance with the invention.

In FIGS. 6–9 there are shown several illustrative, but not exhaustive, arrangements for effecting desired magnetic interaction between an inertia member and pallet lever or other intermittently actuated element of a constant speed mechanism, in accordance with the invention. In FIG. 6, for example, a pallet lever or other element 50 is advantageously formed of ferrite material and has a T-shaped free end provided with N and S poles at opposite ends of the arms of the T. A U-shaped magnet 51, also formed of ferrite material, is mounted on the balance staff 52 and has its arms extending toward and encompassing the transverse arms of the T-shaped element 50. The arms of the U-shaped magnet 51 are polarized oppositely to the adjacent poles of the element 50, such that strongly attractive magnetic interaction is provided between the magnetic elements 50, 51 when the rotary position of the balance wheel 53 is such as to bring the magnetic elements into effective proximity, as indicated in FIG. 6.

Figure 7:
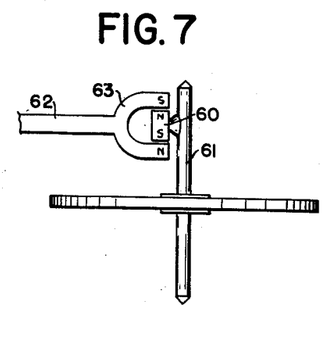

In the arrangement of FIG. 7, a magnetic element 60, in the form of a short bar, is mounted on the balance staff 61 for effective interaction with a pallet lever 62, or other intermittently actuated element. The pallet lever advantageously is formed of ferrite material and has a U-shaped outer end 63, the respective arms of which are polarized to form S and N poles. The polarization of the respective magnetic elements 60, 63 is such that the poles of one element coact principally with dissimilar poles of the other element.

Figure 8:
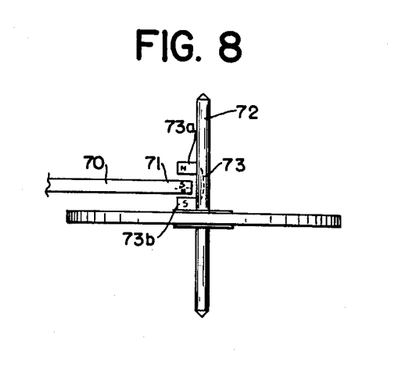

In the arrangement of FIG. 8, the pallet lever or other intermittently operated element is advantageously formed of a straight bar of ferrite material polarized to provide a magnetic end portion 71 having S and N poles. The balance staff 72 is formed to provide an integral magnetic element 73 having radially projecting arms 73a, 73b forming the N and S poles respectively. In practical effect, the magnetic element 73 is similar to the element 51 of FIG. 6, and the operation of the mechanism of FIG. 8 is substantially the same as that of the mechanism of FIG. 6.

Figure 9:
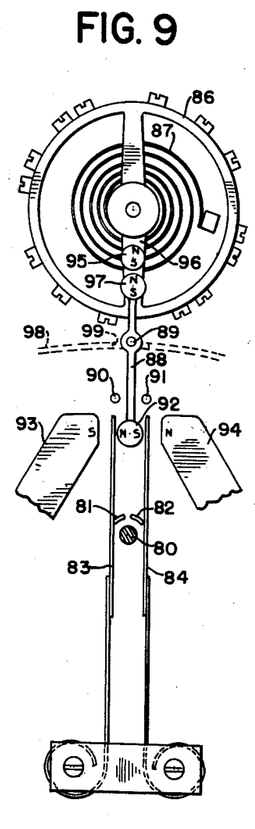
FIGS. 9–11 are sequential views of various operating conditions of a new chronometric governor assembly incorporating the constant speed mechanism of the invention.
Figure 10:
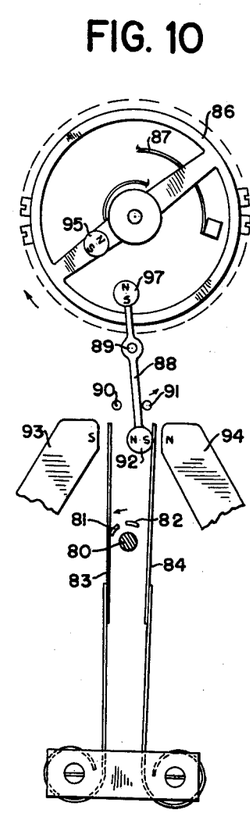
Figure 11:
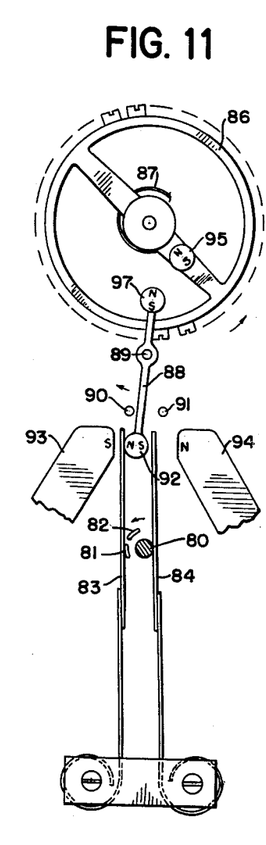

In FIGS. 9–11, the novel constant speed mechanism of the invention is shown to be incorporated in a chronometric governor system, advantageously of the type described and claimed in the copending application of Arthur W. Haydon et al., Ser. No. 721,706, filed March 17, 1958, or in United States Patent No. 2,523,298, issued September 26, 1950, to Arthur W. Haydon. The mechanism specifically illustrated in FIGS. 9–11 is substantially in accordance with the chronometric governor arrangement shown in the beforementioned copending application Ser. No. 721,706, and reference may be made to that application for further specific details of the construction and operation of the governor generally.

In a chronometric governor of the type illustrated in FIGS. 9–11, an electric motor (not specifically shown) is arranged to be driven by a power source calculated to cause the motor to overspeed under normal operating conditions. The motor is provided with a commutator consisting of three elements 80–82 arranged in eccentric configuration for rotation about the central axis of the commutator element 80. The eccentric commutator is straddled by a pair of brush contact elements 83, 84, which are mounted resiliently to follow and maintain contact with the commutator in any rotary position. Thus, considering the commutator and brush contact elements alone, rotations of the rotor and commutator will cause the brushes to be displaced alternately from side to side without, however, breaking contact between the commutator and brushes, which supply the motor with its electrical energy.

Associated with the motor and brush assembly is a constant speed mechanism, generally designated by the numeral 85, which is made in accordance with the present invention and generally comprises a balance wheel 86, hairspring 87 and pallet lever 88. The pallet lever is pivoted at 89 for limited movement between spaced banking pins 90, 91, and the lower end of the pallet lever carries a ferrite magnetic element 92 positioned between the upper ends of the brushes 83, 84. Spaced on each side of the magnet 92 are detent magnets 93, 94 which are of opposite polarity for cooperation with dissimilar pole areas of the magnet 92. Advantageously, the detent magnets 93, 94 are bleeder elements connected in magnetic circuit arrangement with the stator of the motor, as outlined in the beforementioned copending application Ser. No. 721,706.

In accordance with the invention, the pallet lever 88 and balance wheel 86 are provided with cooperating magnetic elements adapted for attractive interaction during a limited portion of the excursion of the balance wheel. Thus, a first magnetic element 95 is mounted on a radial arm 96 of the balance wheel, between the center and rim thereof. The arrangement is such that the magnetic element 95 lies on the neutral axis of the system when the balance wheel is at rest. A second magnetic element 97 is mounted on the upper end of the pallet lever 88 in a position to lie closely adjacent the magnetic element 95, when the system is at rest. Advantageously, both of the magnetic elements 95, 97 are formed of ferrite material polarized such that, when the system is at rest, the poles of the respective elements lie substantially along the neutral axis, with dissimilar poles of the respective elements in close proximity.

To avoid undesired interaction between the balance wheel magnet 95 and the detent magnets 93, 94 (and/or the stator magnets of the motor) a suitable shield 98 may be interposed below the balance wheel. The shield has a small slot 99 adequate to receive the pallet lever and accommodate its normal operative movements.

In the operation of the mechanism of FIGS. 9–11, the rate of rotation of the motor, under normal operating conditions, tends to exceed the oscillating frequency of the balance wheel 86. When the system is functioning normally, and rotation of the eccentric commutator 80–82 has caused displacement to the right of the brush 84, coaction between the balance wheel 86 and the pallet lever 88 will cause the lower end of the pallet lever to swing to the right, against the banking pin 91, substantially as indicated in FIG. 10. The pallet lever is held in its right hand, banked position by attraction between the dissimilar poles of the pallet lever magnet 92 and the detent magnet 94. Accordingly, upon continued rotation of the commutator to the position indicated in FIG. 10, displacing the left hand brush 83 toward the left, the right hand brush 84 is retained in its displaced position by the banked pallet lever, interrupting the electrical circuit to the motor and causing the motor to decelerate.

At a predetermined instant in the operating cycle, counterclockwise rotation of the balance wheel 86 will cause the balance wheel magnet 95 to approach the upper pallet lever magnet 97, establishing effective attractive interaction. Further rotation of the balance wheel 86 will apply a predetermined torque to the pallet lever which, in combination with the inherent restoring force of the resilient brush 84, will cause the pallet lever to be dislodged from its banked, detent position. The brush 84 then is permitted to move to the left, against the commutator element 80, as shown in FIG. 11, imparting an energy impulse to the pallet lever 88 and thereby to the balance wheel 86. After the balance wheel has carried its magnetic element 95 through a limited portion of its excursion, beyond the neutral axis, the magnetic elements 95, 97 are separated and their interaction becomes ineffective.

Following the above-described sequence of events, the system is in the condition shown in FIG. 11, with the pallet lever 88 banked against the pin 90 under the detention force of the magnets 92, 93. Subsequent further rotation of the commutator 80–82 in a counterclockwise direction from the position shown in FIG. 11 will cause the right hand brush 84 to be displaced to the right, while the left hand brush 83 is retained by the pallet lever. Accordingly, the motor circuit is again interrupted until a fixed point in the operating cycle when the balance wheel, approximately midway through its clockwise excursion, carries its magnetic element 95 into proximity with the magnet element 97 on the pallet lever to shift the pallet lever in a counterclockwise direction, releasing the brush 83.

The general operation of the chronometric governor system in the mechanism of FIGS. 9–11 is substantially the same as that of the mechanism of the aforementioned copending application Ser. No. 721,706. However, the improved system has substantial advantages derived from the magnetic interaction of the balance wheel and pallet lever, which avoids mechanical wear problems arising in conventional apparatus and reduces significantly the precision workmanship requirements of mechanisms presently in use.

Figure 12:
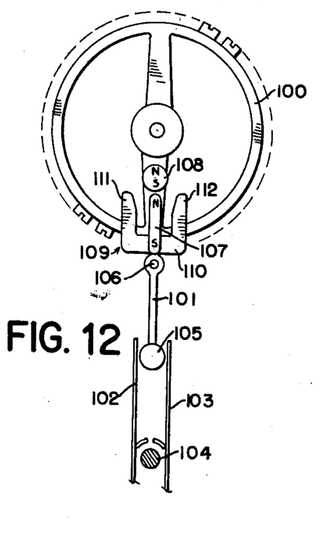
FIGS. 12–14 are sequential views of various operating conditions of a modified form of chronometric governor assembly incorporating the constant speed mechanism of the invention.
Figure 13:
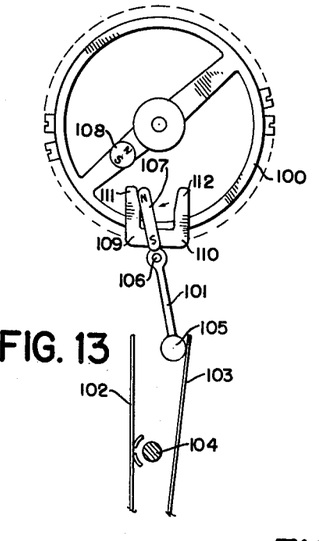
Figure 14:
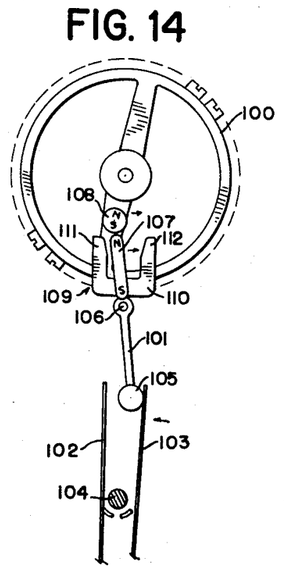

In the system of FIGS. 12–14, the new constant speed mechanism is incorporated in a chronometric governor system generally similar in its operation to that of FIGS. 9–11. However, the constant speed mechanism itself contains substantial further modifications. In general, the system of FIGS. 12–14 includes a balance wheel 100, a pallet lever 101, a pair of brush contact elements 102, 103 straddling the lower end of the pallet lever, and an eccentric commutator 104. The lower end of the pallet lever carries an element 105, which need not be magnetic, arranged to act alternately upon the brush elements 102, 103 substantially in the manner previously described to effect timed closings of the motor circuit.

The pallet lever 101 is pivoted at 106, and its upper portion comprises an elongated section 107 of ferrite or other suitable magnetic material polarized to provide effective magnetic poles at each end. The balance wheel 100 also carries a magnetic element 108, advantageously formed of ferrite material and polarized and located in such manner that a pole thereof is dissimilar to and in close proximity to the upper or N pole of the magnetic element 107 when the system is at rest.

In accordance with one of the specific aspects of the invention, there is mounted adjacent the upper end 107 of the pallet lever a U-shaped element 109, formed of magnetizable material, advantageously soft iron. The U-shaped element 109 is positioned symmetrically with respect to the magnetic upper end element 107 of the pallet lever, with the base portion 110 of the U positioned substantially adjacent the S pole of the magnetic element 107 and the spaced arms 111, 112 of the U extending upward in straddling relation to the magnetic element 107.

The general sequence of operations of the balance wheel 100, pallet lever 101, brushes 102, 103 and eccentric commutator 104 is substantially the same as the system of FIGS. 9–11 and will not be further described. However, as a principal feature of modification, banking and detention of the pallet lever 101 is accomplished by mechanical and magnetic interaction between the U-shaped magnetizable element 109 and the magnetic element 107 of the pallet lever. Thus, when the pallet lever 101 is pivoted counterclockwise, as indicated in FIG. 13, the upper or N pole section of the magnetic element 107 approaches the left hand arm 111 and the left hand side of the U-shaped element 109 completes a magnetic circuit between the N and S poles of the element 107. This sets up an attractive magnetic interaction, so that the magnetic element 107 is drawn against the arm 111, and held with a predetermined detention force. Advantageously, the upper end portions of the arms 111, 112 are beveled in divergent relation to provide an area of flat contact with the magnetic element 107, when the pallet lever 101 is pivoted to one of its principal operating positions.

In the system of FIGS. 12–14, the U-shaped magnetizable element 109 serves not only as magnetic detent means for the pallet lever 101, but also serves in a mechanical capacity as a banking means. Thus, as indicated in FIG. 13, the upwardly extending arm 111 of the U-shaped member comprises a mechanical stop, limiting the counterclockwise pivoting movement of the pallet lever 101.

As indicated in FIG. 14, during the limited, middle portion of the counterclockwise excursion of the balance wheel 100, the balance wheel magnetic element 108 is brought into proximity to the pallet lever magnetic element 107 to establish effective, attractive magnetic interaction therewith. The magnetic element 107 is thereupon dislodged from its detent position and caused to swing in a clockwise direction to its opposite detent position, with the pallet lever magnet 107 being banked and retained by the right hand arm 112 of the U-shaped magnetizable element 109. As previously described, an energy impulse is imparted to the balance wheel 100 during the traverse of the pallet lever from one principal or detent position to the other, through the action of the displaced, resilient brush elements 102, 103.

Figure 15:
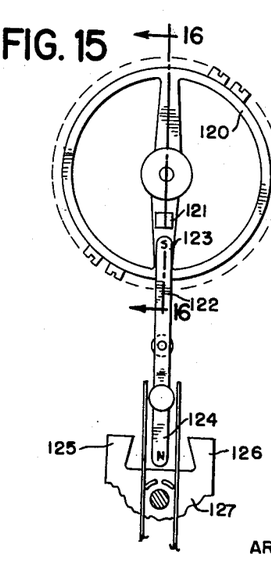
FIG. 15 is a simplified view of a further modified form of chronometric governor assembly incorporating the constant speed mechanism of the invention.
Figure 16:
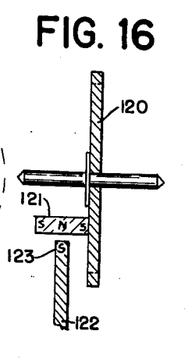
FIG. 16 is a fragmentary cross sectional view taken on line 16—16 of FIG. 15.

The system of FIGS. 15 and 16 bears substantial similarity to the system of FIGS. 12–14, except that the combined banking and detent means acts upon the lower end of the pallet lever. Thus, with particular reference to FIG. 15, the system includes a balance wheel 120 mounting a magnetic element 121, a pallet lever 122 having magnetized upper and lower end portions or, more advantageously, being formed entirely of magnetic material and so polarized as to provide poles at its opposite ends. The pole 123 at the upper end of the pallet lever cooperates with the balance wheel magnetic element 121 in the manner before described. The element 121, however, represents a slight modification from forms previously described, being formed of a bar of ferrite material polarized in the manner shown in FIG. 16 to provide S poles at its ends and an N pole in the center. The upper end of the pallet lever 122 being polarized to provide an S pole, is positioned to interact with the N pole of the balance wheel magnet 121 during a limited mid portion of the balance wheel excursion.

The lower end of the pallet lever 122 is polarized to provide an N pole 124, which moves between two principal operating positions defined by upwardly extending arms 125, 126 of a U-shaped magnetizable member 127. The arms of the magnetizable member 127 not only act as banking means for the pallet lever, but interact magnetically therewith to apply a predetermined detention force to the pallet lever when the latter is displaced to one side or the other by the action of the balance wheel 120.

Figures 17, 18, 19, 20, 21, 22, 23:
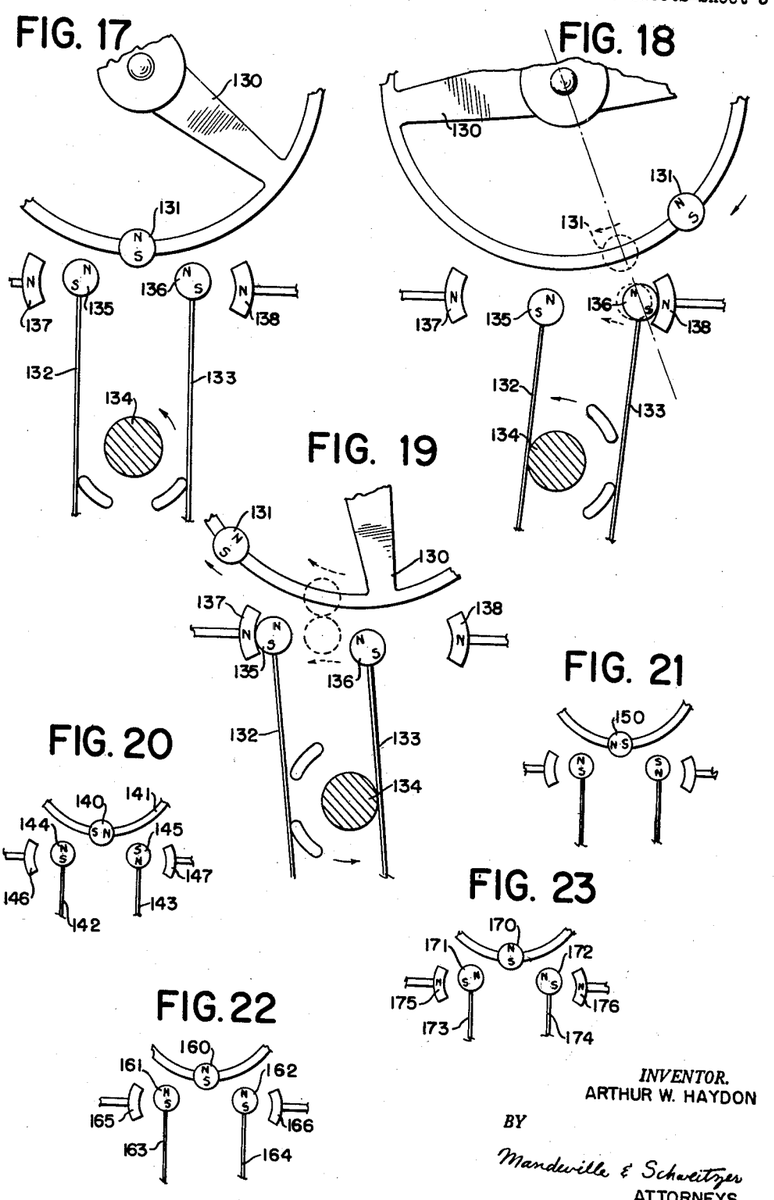
FIGS. 17–19 are enlarged, fragmentary views, showing sequential operating conditions, of a new form of chronometric governor incorporating the constant speed mechanism of the invention in a manner permitting omission of a pallet lever.
FIGS. 20–23 are simplified, fragmentary views of a number of modifications of the mechanism of FIGS. 15–17.

In the systems of FIGS. 17–19, the magnetically coupled constant speed mechanism of the invention is fully integrated with a chronometric governor mechanism in a unique manner which permits the pallet lever to be eliminated completely from the system. Referring initially to FIG. 17, the system comprises a balance wheel 130 mounting a ferrite magnetic element 131 on its rim, the element having a rest position on the neutral axis of the system, and having its poles aligned with such axis. A pair of brush contact elements 132, 133 are mounted in straddling relation to an eccentric commutator 134, and have their end portions projecting upward into close proximity to the rim of the balance wheel 130. In accordance with the invention, each of the brush elements 132, 133 is provided with a magnetic element 135, 136 at its upper end, the last mentioned magnetic elements being positioned for attractive magnetic interaction with the balance wheel magnet 131 during respective limited portions of the balance wheel excursion.

As shown in FIG. 17, the brush element magnets 135, 136 advantageously have their poles oriented along axes which intersect above the brush elements and substantially along the neutral axis. And, in the specifically illustrated mechanism, the S pole of the balance wheel magnet 131 is directed radially outward of the balance wheel while the N poles of the brush magnets 135, 136 are directed upward and inward for effective interaction with the S pole of the balance wheel magnet. The S poles of the brush magnets 135, 136 are directed downward and outward and are arranged for effective interaction with detent magnets 137, 138 positioned adjacent the brush magnets and spaced a predetermined distance outward from the rest position of the brush magnets.

In the operation of the mechanism of FIGS. 17–19, assuming the eccentric commutator 134 to be rotating counterclockwise from the neutral position shown in FIG. 17, the right hand brush 133 is displaced to the right, causing its magnetic element 136 to be attracted to and engaged by the detent magnet 138. Upon continued rotation, the commutator will release the brush 133 while displacing the left hand brush 132 toward the left. However, the right hand brush 133 will be held in its detent position, as shown in FIG. 18, by the attractive interaction of the magnetic elements 136, 138.

Shortly after release of the brush 133 by the commutator, and at a fixed instant in the operating cycle of the system, the balance wheel 130, going through a clockwise excursion, brings its magnet 131 into proximity with the magnetic element 136 on the right hand brush element 133. When the balance wheel magnet 131 reaches the position shown in broken lines in FIG. 18, there is a strongly attractive interaction between the magnets 131 and 136. And, in this respect, it will be noted that the angular orientation of the polar axis of the magnetic element 136 is such that, when the balance wheel magnet 131 is in the position shown in broken line in FIG. 18, the poles of both of the magnetic elements 131, 136 are aligned substantially along the same axis (i.e., radial with respect to the balance wheel) with the S pole of the magnet 131 in close proximity to the N pole of the magnetic element 136.

In accordance with the invention, the attractive interaction between the magnetic elements 131, 136 is sufficient to overcome the attractive force between the magnetic element 136 and the detent magnet 138. Accordingly, with continued clockwise movement of the balance wheel 130, the right hand brush contact element 133 is dislodged from its detent position. Once dislodged, the brush element 133 moves resiliently to the left, into contact with the commutator 134, substantially as indicated in FIG. 19, to re-establish the motor circuit through the commutator. The contact element 133, being resiliently urged toward the commutator, imparts a fixed impulse of energy to the balance wheel before the balance wheel magnet 131 becomes separated, through its continued clockwise rotation, from the magnetic element 136.

Following the above-described sequence of events, the system will be in the condition shown in FIG. 19. Continued counterclockwise rotation of the commutator 134 will then carry the commutator out of contact with the brush element 132 which, however, is held in its detent position by attraction between the magnetic element 135 and the detent magnet 136. Subsequently, at a fixed instant in the cycle, the balance wheel magnet 131, in the course of its counterclockwise excursion, will dislodge the magnetic element 135 from its detent position, substantially as described in connection with FIG. 18.

The system of FIGS. 17–19 is particularly advantageous in that there is no mechanical intermediary, such as a pallet lever, acting between the balance wheel and the brush contact elements 132, 133. This arrangement permits substantial further simplification of the mechanism and completely eliminates one of the members subject to substantial wear. Further, the arrangement is uniquely adapted for incorporation in chronometric governor systems of the type shown in the A. W. Haydon Patent No. 2,523,298, or in the A. W. Haydon et al. copending application Ser. No. 721,706.

The particular arrangement of the magnetic elements 131, 135, 136 of the system of FIGS. 17–19 has special advantages, in that the magnetic elements 135, 136, while coacting with the balance wheel magnet 131 and the detent magnets 137, 138, have a more efficient interaction with the balance wheel magnet than with the detent magnet.

Thus, by aligning the poles of the magnetic elements 135, 136 along axes intercepting above the magnets, the magnet poles are disposed substantially radially with respect to balance wheel whenever one of the magnetic elements 135, 136 is in a detent position. At the same time, the S pole of the magnetic element 135 or 136 lies slightly closer to the detent magnet than the N pole, to provide for a balance of attractive force for detent purposes. However, the magnetic interaction between the detent magnets and the magnetic elements 135, 136 is relatively inefficient, compared to the interaction with the balance wheel magnet 131, such that the brush contact elements are readily dislodged from their detent position by movements of the balance wheel.

In the modified system of FIG. 20, the balance wheel magnet 140, has its poles aligned generally circumferentially on the balance wheel 141. That is, the polar axis is tangent to a radius line extending from the center of the balance wheel. The system, which is generally similar to the system of FIGS. 17–19, includes a pair of brush contact elements 142, 143 mounting at their upper ends magnetic elements 144, 145. Detent elements 146, 147, formed of a magnetizable material such as soft iron, are positioned adjacent and outside the magnetic elements 144, 145. In the modified arrangement, the poles of the magnetic elements 144, 145 are aligned generally vertically, and the left hand magnetic element has its N pole at the top, while the right hand magnetic element 145 has its N pole at the bottom. The orientation of the balance wheel magnet 140 is such that the S pole is at the left and the N pole is at the right.

The operation of the system of FIG. 20 is generally similar to that of the system of FIGS. 17–19. However, detent action between the magnetic elements 144, 145 and the detent elements 146, 147 is obtained by magnetization of the respective magnetic elements when the detent elements are moved into contact therewith by the rotating commutator. As will be understood, the specific magnetic interaction between the elements 144, 145 and the balance wheel magnet 140 will be slightly different in the system of FIG. 20 than in the system of FIGS. 17–19 because of the somewhat different polar orientation of the magnets. The system of FIG. 20 is advantageous in certain respects, particularly with respect to improved self-starting characteristics of the complete mechanism whereby, upon energization of the motor, the balance wheel 141 automatically is set into operation.

The system of FIG. 21 is substantially similar to that of FIG. 20, except that the polar orientation of the balance wheel magnet 150 is reversed. The operation of the systems of FIGS. 20 and 21 is quite similar, there being specific differences in the magnetic interactions, however, resulting from the relatively reversed orientations of the respective magnetic elements 140, 150 carried by the balance wheels.

In the further modified system of FIG. 22, the balance wheel magnet 160 has its poles oriented on a radial axis, as in the system of FIGS. 17–19. Magnetic elements 161, 162, on the respective brush contact members 163, 164, have their poles oriented generally vertically, with the N poles of both elements being at the top. In the operation of the system of FIG. 22, the coaction between the magnetic elements 161, 162 and the balance wheel magnet 160 is substantially similar to that of FIGS. 17–19, being slightly less efficient, perhaps, in view of the generally vertically polar orientation of the elements 161, 162. The cooperation between the magnetic elements 161, 162 and detent elements 165, 166 is substantially the same as that of the systems of FIGS. 20, 21.

The system of FIG. 23 is substantially similar to that of FIGS. 17–20, except that the polar axes of the magnetic elements 171, 172, mounted on brush element 173, 174 are angled sharply inward, substantially to intersect with the balance wheel magnet 170 when the latter is in its neutral position. As compared to the system of FIGS. 17–19, the system of FIG. 23 affords greater or more efficient attractive cooperation between the magnetic elements 171, 172 and respective detent magnets 175, 176. At the same time, a less efficient magnetic interaction is afforded between the magnetic elements 171, 172, and the balance wheel magnet 170. The comparison demonstrates the facility with which the pertinent magnetic interactions may be varied, one with respect to the other, to achieve the most efficient overall performance of the system.

In any of its various forms, the system of the invention represents a substantial advance through the elimination of substantial mechanical interactions in a constant speed system, such as a clock, timer, governor or the like. By making advantageous use of special-property magnetic materials, such as ferrite magnets, uniquely advantageous constant speed systems can be assembled for a variety of end uses.

One of the significant practical advantages of the invention resides in the fact that constant speed systems incorporating the invention may be manufactured with less attention in significant areas to the high order of precision workmanship normally required without, however, undesirably affecting the accuracy, reliability or durability of the system. At the same time, through the elimination of significant points of wear, a number of "jewel" bearings and other "jewelled" wear elements may be omitted, with significant savings being realized.

Extraordinary advantages are realized, moreover, in the various systems illustrated in FIGS. 17–23, which provide for direct interaction between a balance wheel and the brush contact members of a chronometric governor, permitting the complete elimination of an intermediate element, such as a pallet lever, which heretofore had been considered to be a necessary element of the system.

It should be understood, however, that the various forms of the invention herein specifically illustrated and described, are intended to be representative only, since certain changes may be made therein without departing from the clear teachings of the disclosure. Accordingly, reference should be made to the following appended claims determining the full scope of the invention.

I claim:

1. A constant speed mechanism comprising a constantly oscillating inertia member having regular cycles comprised of two inactive and two active periods, an intermittently actuated member movably mounted adjacent said inertia member and having alternative operating positions, said intermittently actuated member having regular cycles comprised of two inactive and two active periods corresponding to those of said inertia member, said intermittently actuated member being movable during said active periods and stationary during said inactive periods, first magnetic means on said inertia member having a predetermined first field of influence, second magnetic means on said intermittently actuated member having a predetermined second field of influence, said first and second magnetic means being positioned to accommodate effective magnetic interaction of said first and second fields at predetermined limited active portions only of the oscillating excursion of the inertia member during said active periods, the fields of influence of said first and second magnetic means being so related that said first field acts upon said second field at the commencement of said active periods to initiate movement of said intermittently actuated means from one alternative operating position toward the other at regular intervals determined by the natural frequency of said inertia member, and external energy input means acting upon said intermittently actuated member during said active periods to effect movement of said member from one alternative operating position toward the other, said second field of influence during said active period acting upon said first field of influence to impart to said inertia member a predetermined increment of energy to sustain the oscillatory motion of said inertia member, said first magnetic means moving beyond the effective influence of said second magnetic means during said inactive periods, said inactive periods commencing at the arrival of said intermittently actuated member at one of its alternative operating positions.

2. The constant speed mechanism of claim 1 which includes detent means acting on said intermittently actuated member and tending to hold said member in at least one of its alternative operating positions in opposition to a predetermined moving force resulting from the operation of the energy input means, said moving force and the effective magnetic interaction of said first and second fields of influence at said regular intervals being greater than the holding force of said detent means by an amount sufficient to effect dislodgement of said intermittently operative member from its operating position and to enable movement of said member under the influence of said moving force toward its other operative position.

3. The constant speed device of claim 1, which includes banking means cooperating with the intermittently operable member whereby said member is movable between its operating positions through a predetermined limited distance, said first magnetic means being movable by said inertia member through a predetermined substantially greater distance.

4. The constant speed device of claim 3, in which said inertia member is mounted for rotary oscillating movement, and said first magnetic means is carried by said inertia member through an arcuate path generally toward and then away from the second magnetic means.

5. The constant speed device of claim 1, in which the first and second magnetic means are oriented in a manner providing for said effective magnetic interaction to be attractive and to take place between unlike poles of the respective magnetic means.

6. The constant speed device of claim 5, in which the first and second magnetic means comprise respective magnetic elements each having predetermined areas of opposite polar orientation, and the respective magnetic elements are mounted on the inertia member and intermittently actuated member in such relative orientation that areas of opposite polar orientation of the respective elements are in significantly closer relation during the period of effective magnetic interaction than areas of like polar orientation.

7. The constant speed device of claim 6, in which one of the magnetic elements is a generally U-shaped element having arm portions of opposite magnetic polarity and the other of said magnetic elements is aligned for movement between said arm portions.

8. The constant speed device of claim 1, which includes magnetic detent means mounted for coaction with the intermittently actuated member and operative to retain said member in at least one of its operative positions with a predetermined detention force.

9. The constant speed device of claim 8, in which the magnetic detent means comprises a magnetic element having an effective magnetic pole positioned for coaction with an unlike pole of the second magnetic means.

10. The constant speed device of claim 8, in which the magnetic detent means comprises a magnetizable element mounted for coaction with the second magnetic means.

11. The constant speed device of claim 1, in which the intermittently actuated member comprises a pallet lever mounted for limited pivoting movement, an escape wheel is mounted for rotation adjacent the pallet lever and comprises said energy input means, means are provided for urging the escape wheel to rotate in a predetermined direction, and magnetically interacting means are included on said pallet lever and escape wheel for accommodating incremental rotational movements of said escape wheel upon successive actuations of said pallet lever between its operative positions.

12. The constant speed device of claim 11, in which the magnetically interacting means on said pallet lever and escape wheel comprise a pair of spaced magnetic poles on said pallet lever adapted to be brought alternately into effective proximity to said escape wheel upon successive actuations of said pallet lever between its operative positions, and a plurality of successive magnetic poles of opposite polarity spaced circumferentially about the escape wheel.

13. The constant speed mechanism of claim 12, in which the spaced magnet poles on said pallet lever are of opposite effective polarity.

14. The constant speed mechanism of claim 12, in which the spaced magnet poles on said pallet lever are of similar effective polarity.

15. The constant speed device of claim 12, in which the escape wheel has a plurality of radially projecting abutment-like elements, the abutment-like elements comprising magnetic poles of one polarity and the areas between said elements comprising magnetic poles of opposite polarity.

16. The constant speed device of claim 15, in which the magnetic poles on said pallet lever are of like polarity and of the same polarity as the abutment-like elements of the escape wheel.

17. The constant speed device of claim 1, in which the intermittently actuated member comprises a pallet lever mounted for limited pivoting movement between its operative positions, the second magnetic means is mounted on one end of the pallet lever, a pair of deflectable contact members are mounted in straddling relation to the other end of the pallet lever in normally interfering relation to the normal pivotal excursions of the pallet lever, said energy input means includes means for deflecting the contact members alternately out of said interfering relation to accommodate complete pivotal excursions of the pallet lever, and magnetic detent means coact with the pallet lever to retain the lever in its respective operating positions under a predetermined detention force.

18. The constant speed device of claim 17, in which the magnetic detent means comprises a magnetizable element mounted for coaction with said second magnetic means when said pallet lever is in its operative positions.

19. The constant speed device of claim 17, in which the magnetic detent means comprises detent magnet means on said other end of the pallet lever, and cooperating detent means mounted in straddling relation to the detent magnet means and having effective magnetic interaction therewith when said pallet lever is in its operative positions.

20. The constant speed device of claim 19, in which the cooperating detent means comprises magnetic means having effective poles of opposite polarity to the effective pole of the detent magnet.

21. The constant speed device of claim 19, in which the cooperating detent means comprises magnetizable means having effective magnetic interaction with the detent magnet when the pallet lever is in its operative positions.

22. A constant speed mechanism in accordance with claim 1 in which said energy input means comprises a rotatable eccentric element and said intermittently actuated member comprises a resilient deflectable means, said deflectable means being mounted in operative relation with said eccentric element and being normally in contact therewith, said deflectable means being alternately displaceable on rotation of said eccentric element, said constant speed mechanism further including detent means tending to hold the deflectable means in displaced position with a predetermined detention force greater than the resilient restoring force of the deflectable means, said first and second magnetic means having an effective magnetic interaction operative in conjunction with the resilient restoring force of the displaced deflectable means to effect dislodgement of the displaced deflectable means from detent position, said deflectable means being operative to store energy upon displacement and to impart predetermined increments of energy to said inertia member when dislodged from detent position.

23. The constant speed device of claim 22, in which the deflectable means comprises a pair of deflectable elements forming electrical contacts, the energy input means comprises an electric motor having an energizing circuit including said contacts and said circuit is opened by rotation of the eccentric element while one of said contacts is held in its detent position.

24. The constant speed device of claim 23, in which the eccentric element comprises a commutator for said motor, and said contacts constitute brushes forming an interruptable circuit to said commutator.

25. The constant speed device of claim 22, in which the oscillatory path of said oscillating member is substantially greater than the travel of the second magnetic means upon displacement of the deflectable means.

26. The constant speed device of claim 22, in which the detent means comprises third magnetic means cooperating with said second magnetic means.

27. The constant speed device of claim 26, in which said third magnetic means is mounted adjacent the second magnetic means and has poles oriented for effective interaction with dissimilar poles of the second magnetic means when the deflectable means are in detent position.

28. The constant speed device of claim 22, in which the inertia member is a balance member oscillated by a hair spring, and the first magnetic means is carried by the balance member and has its principal poles aligned generally radially with respect to the oscillating axes of said balance member.

29. The constant speed device of claim 28, in which the second magnetic means are so oriented with respect to said balance member and deflectable means as to have magnetic poles generally radially aligned with the oscillating axis of the balance member when the deflectable means are in detent position.

30. The constant speed device of claim 28, in which the poles of the first magnetic means comprise a pair of magnetic elements oriented on axes intersecting between the respective magnetic elements and the oscillating axis of said balance member.

31. The constant speed device of claim 22, in which the inertia member is a balance member oscillated by a hair spring, and the first magnetic means is carried by the balance member and has its principal poles aligned generally circumferentially with respect to the oscillating axis of the balance member.

32. The constant speed device of claim 31, in which the second magnetic means comprises a pair of magnetic elements of reverse polarity with respect to each other.

33. The constant speed device of claim 32, in which the magnetic elements are so oriented that, when the first magnetic means is centered therebetween, the principal effective magnetic interaction takes place between dissimilar poles of the magnetic elements and the first magnetic means.

34. The constant speed device of claim 32, in which the magnetic elements are so oriented that, when the first magnetic means is centered therebetween, the principal effective magnetic interaction takes place between similar poles of the magnetic elements and the first magnetic means.

References Cited by the Examiner
UNITED STATES PATENTS

| | | | |
|---|---|---|---|
| 1,970,412 | 8/34 | Bates | 200—90 |
| 2,669,089 | 2/54 | Straumann | 58—121 |
| 2,869,062 | 1/59 | Haydon | 318—311 |
| 2,924,102 | 2/60 | Drouhot | 74—1.5 |

FOREIGN PATENTS 1,161,046　3/58　France.

LEYLAND M. MARTIN, *Primary Examiner.*

JOSEPH P. STRIZAK, LEO SMILOW, *Examiners.*